(12) United States Patent
Lamb et al.

(10) Patent No.: US 10,701,129 B2
(45) Date of Patent: *Jun. 30, 2020

(54) MEDIA PLATFORM FOR ADDING SYNCHRONIZED CONTENT TO MEDIA WITH A DURATION

(71) Applicant: Multipop LLC, Oak Park, IL (US)

(72) Inventors: Joshua Lamb, Oak Park, IL (US); Steven E. Harshbarger, Corte Madera, CA (US)

(73) Assignee: Multipop LLC, Oak Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,546

(22) Filed: Jun. 5, 2018

(65) Prior Publication Data

US 2018/0288128 A1 Oct. 4, 2018

Related U.S. Application Data

(63) Continuation of application No. 14/490,639, filed on Sep. 18, 2014, now Pat. No. 9,998,518.

(51) Int. Cl.
| | |
|---|---|
| *G06F 17/24* | (2006.01) |
| *H04L 29/08* | (2006.01) |
| *G06Q 30/06* | (2012.01) |
| *G06F 3/0484* | (2013.01) |
| *G06F 16/78* | (2019.01) |

(Continued)

(52) U.S. Cl.
CPC ............ *H04L 67/02* (2013.01); *G06F 3/0482* (2013.01); *G06F 3/04817* (2013.01); *G06F 3/04847* (2013.01); *G06F 16/275* (2019.01); *G06F 16/4393* (2019.01); *G06F 16/748* (2019.01); *G06F 16/78* (2019.01); *G06Q 30/0641* (2013.01)

(58) Field of Classification Search
CPC ..... H04L 67/02; H04L 65/4084; H04L 67/10; G06F 3/04847; G06F 17/30581; G06F 16/27; G06F 16/40; G06F 16/748; G06F 16/7867; G06F 3/0484
See application file for complete search history.

(56) References Cited

U.S. PATENT DOCUMENTS 6,789,105 B2 * 9/2004 Ludwig .................. G06Q 10/10
709/204
9,258,459 B2 * 2/2016 Hartley ..................... H04N 9/87
(Continued)

*Primary Examiner* — Wilson W Tsui
(74) *Attorney, Agent, or Firm* — Patent Ingenuity, P.C.; Samuel K. Simpson

(57) ABSTRACT

A video authoring system has an authoring computing device that generates a visual synchronization layout, via a graphical user interface without user-based inputting of computer executable code, for a video with a time duration and for content to be added to the video at one or more time-based positions within the video. The video authoring system also has a processor, in operable communication with the authoring computing device, that sends data associated with the visual synchronization layout to a remote server that automatically generates a manifest based on the data associated with the visual synchronization layout. The manifest is computer executable code that is executed by a media player at a computing device so that the media player plays the video in synchronization with the content.

2 Claims, 8 Drawing Sheets

(51) Int. Cl.
*G06F 16/27* (2019.01)
*G06F 16/438* (2019.01)
*G06F 3/0482* (2013.01)
*G06F 3/0481* (2013.01)
*G06F 16/74* (2019.01)

(56) References Cited

U.S. PATENT DOCUMENTS

| | | | | |
|---|---|---|---|---|
| 9,486,698 B2* | 11/2016 | Chung | | H04N 21/274 |
| 2001/0047266 A1* | 11/2001 | Fasciano | | G11B 27/034 |
| | | | | 704/278 |
| 2002/0112247 A1* | 8/2002 | Horner | | H04N 5/4401 |
| | | | | 725/112 |
| 2003/0093790 A1* | 5/2003 | Logan | | G06F 17/30265 |
| | | | | 725/38 |
| 2006/0098941 A1* | 5/2006 | Abe | | G11B 27/031 |
| | | | | 386/279 |
| 2007/0086099 A1* | 4/2007 | Ando | | G11B 20/10527 |
| | | | | 360/1 |
| 2007/0201502 A1* | 8/2007 | Abramson | | H04L 67/32 |
| | | | | 370/429 |
| 2007/0201815 A1* | 8/2007 | Griffin | | G11B 27/034 |
| | | | | 386/231 |
| 2007/0266414 A1* | 11/2007 | Kahn | | H04N 7/162 |
| | | | | 725/113 |
| 2009/0197238 A1* | 8/2009 | Moffatt | | G09B 7/02 |
| | | | | 434/430 |
| 2010/0042682 A1* | 2/2010 | Kaye | | G11B 27/034 |
| | | | | 709/203 |
| 2010/0293190 A1* | 11/2010 | Kaiser | | G06F 3/048 |
| | | | | 707/769 |
| 2012/0236201 A1* | 9/2012 | Larsen | | G06Q 10/10 |
| | | | | 348/468 |
| 2012/0237185 A1* | 9/2012 | Satoh | | H04N 21/23424 |
| | | | | 386/278 |
| 2012/0301111 A1* | 11/2012 | Cordova | | H04N 9/8205 |
| | | | | 386/245 |
| 2013/0011121 A1* | 1/2013 | Forsyth | | G11B 27/034 |
| | | | | 386/245 |
| 2013/0013991 A1* | 1/2013 | Evans | | H04N 5/765 |
| | | | | 715/206 |
| 2013/0036201 A1* | 2/2013 | McLaughlin | | H04N 21/2393 |
| | | | | 709/219 |
| 2013/0311595 A1* | 11/2013 | Milatinovici | | H04N 21/26275 |
| | | | | 709/214 |
| 2014/0026048 A1* | 1/2014 | Spirer | | G06F 3/0484 |
| | | | | 715/716 |
| 2014/0082661 A1* | 3/2014 | Krahnstoever | | H04N 21/435 |
| | | | | 725/32 |
| 2014/0186004 A1* | 7/2014 | Hamer | | H04N 21/21805 |
| | | | | 386/223 |
| 2014/0201631 A1* | 7/2014 | Pornprasitsakul | | G11B 27/031 |
| | | | | 715/716 |
| 2014/0219637 A1* | 8/2014 | McIntosh | | G11B 27/105 |
| | | | | 386/282 |
| 2015/0106841 A1* | 4/2015 | Wolf | | H04N 21/812 |
| | | | | 725/32 |
| 2015/0187389 A1* | 7/2015 | Horita | | G11B 27/036 |
| | | | | 386/264 |
| 2016/0191961 A1* | 6/2016 | Fisher | | H04N 21/234309 |
| | | | | 725/116 |

* cited by examiner

MEDIA PLATFORM FOR ADDING SYNCHRONIZED CONTENT TO MEDIA WITH A DURATION

RELATED APPLICATIONS

This patent application is a continuation of U.S. patent application Ser. No. 14/490,639, filed on Sep. 18, 2014, entitled MEDIA PLATFORM FOR ADDING SYNCHRONIZED CONTENT TO MEDIA WITH A DURATION, which is hereby incorporated by reference in its entirety.

BACKGROUND

1. Field

This disclosure generally relates to the field of computing systems. More particularly, the disclosure relates to media players.

2. General Background

Current media systems are limited in their ability to allow authors to customize content for videos displayed in video players. For instance, an author may want to add content to an existing video so that a user may view a video with the additional content. That author currently has to be able to manually prepare code, e.g., html code, that would add such content with the video.

Such a manual coding process is cumbersome and tedious. The author has to prepare significant amounts of code to perform even simple tasks. Further, such an authoring process does not have a visual design component. As a result, the authoring process is more concentrated on coding rather than designing the visual appearance of a layout with a video and additional content.

The authoring process is also limited to authors that are familiar with coding. Therefore, potential authors are prevented from authoring layouts for videos and additional content. Thus, current media systems are not adequate for providing the ability to add content to media.

SUMMARY

In one embodiment, a video authoring system has an authoring computing device that generates a visual synchronization layout, via a graphical user interface without user-based inputting of computer executable code, for a video with a time duration and for content to be added to the video at one or more time-based positions within the video. The video authoring system also has a processor, in operable communication with the authoring computing device, that sends data associated with the visual synchronization layout to a remote server that automatically generates a manifest based on the data associated with the visual synchronization layout. The manifest is computer executable code that is executed by a media player at a computing device so that the media player plays the video in synchronization with the content.

In another embodiment, a computer program product is also provided. The computer program product includes a non-transitory computer usable device that stores a computer readable program. The computer readable program when executed on a computer causes the computer to perform the functionality of the video authoring system. In yet another embodiment, a process is provided to perform the functionality of the video authoring system.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 2A illustrates a media configuration display screen.

FIG. 2B illustrates a popup configuration display screen that may be utilized by the author 102 to generate content synchronization data.

FIG. 2C illustrates a popup generation display screen.

FIG. 3A illustrates a media player display screen.

FIG. 3B illustrates a media player display screen that displays images of each popup.

DETAILED DESCRIPTION

A media system may be utilized to add content to media with a time duration. The media system allows authors to visually generate a layout for both media with a time duration, e.g., video and/or audio, and additional content through a user interface. The authors are not required to have any understanding of coding.

Figure 1:
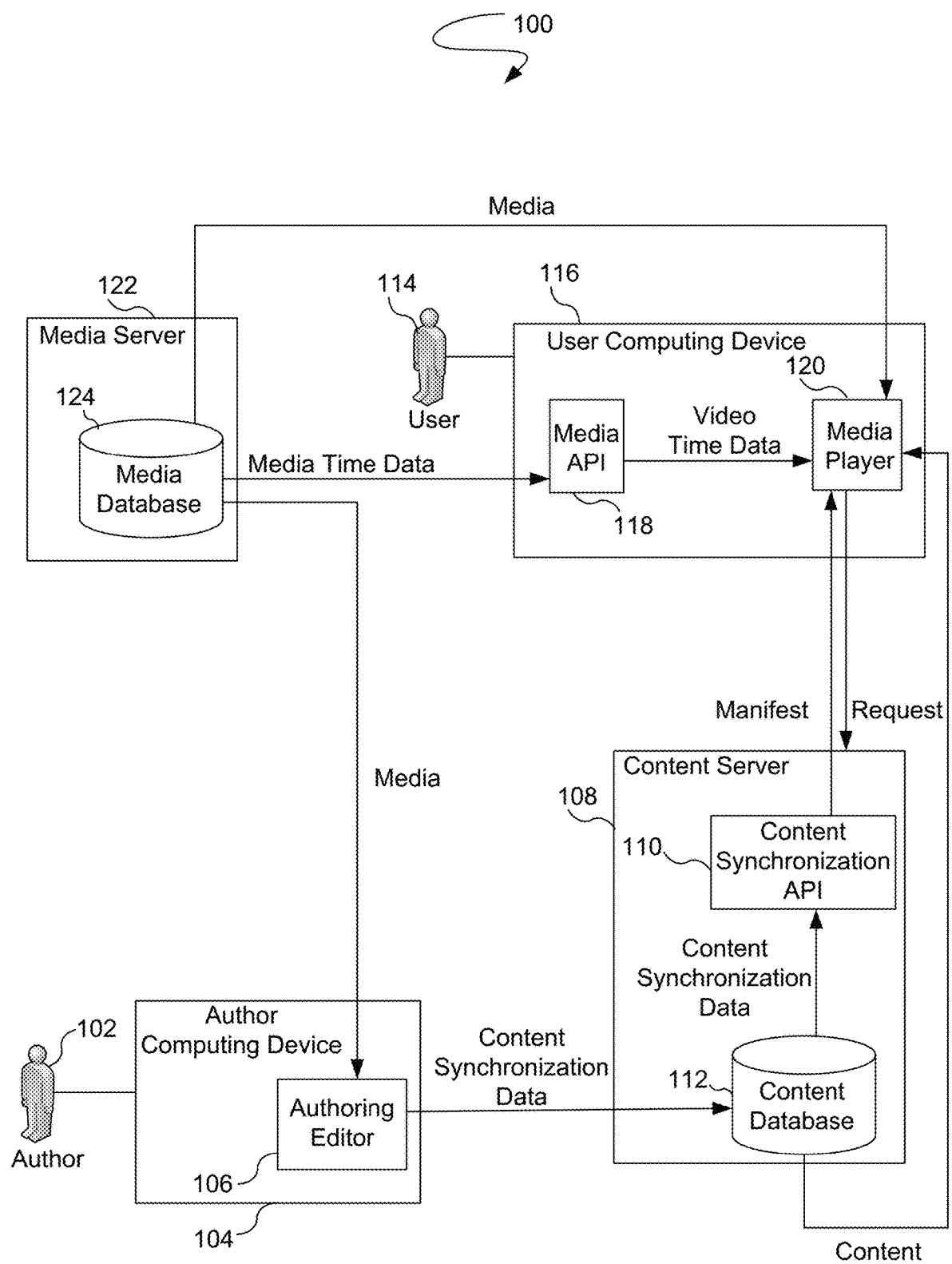
FIG. 1 illustrates a media configuration.

FIG. 1 illustrates a media configuration 100. The media configuration 100 includes an author computing device 104 for an author 102 and a user computing device 116 for a user 114. The author 102 utilizes the author computing device 104 to author a layout for media with a time duration and additional content so that the user 114 may play media with the additional content at the user computing device 116. For ease of illustration, the author computing device 104 and the user computing device 116 are illustrated as different devices for an author 102 that is distinct from a user 114. If the author 102 and the user 114 are the same person, a single device may be utilized for the author computing device 104 and the user computing device 116. For example, the author may want generate a preview of the layout or generate the layout for personal consumption.

The author computing device 104 may be a personal computer, laptop computer, smartphone, smartwatch, tablet device, other type of mobile computing device, etc. The author 102 accesses an authoring editor 106 to prepare a layout for media and additional content. In one embodiment, the authoring editor 106 is a set of code, e.g., a software application, that is stored on the author computing device 104. For example, the author 102 utilizing a tablet device for the author computing device 104 may download a software application for the authoring editor 106 that is then stored on the author computing device 104. As another example, the tablet device may have the authoring editor 106 preloaded. In another embodiment, the authoring editor 106 may be stored in a cloud computing environment and then accessed and rendered via a web browser on the author computing device 104.

The media configuration 100 also has a content server 108 and a media server 122. The content server 108 communicates with the author computing device 104 to store data for the layout generated by the author computing device 104. The media server 122 stores the media, e.g., video and/or audio, to which content is being added. Therefore, distinct servers 108 and 122 are utilized to store each of the additional content and media. As a result, the media configuration 100 allows for authoring a layout independently of any particular media server or media player.

The authoring editor 104 receives media from the video server 122. For example, the author 102 searches a website for a particular cooking video and then plays that cooking video within the authoring editor 106 to determine content synchronization data, i.e., times during the cooking video to place the additional content so that the additional content will appear in a synchronized manner at those times during playback of the media. For instance, the additional content may be a link to a website to purchase the cooking items that appear in the media at the times provided by the synchronization data. The additional content may be a variety of content, e.g., images, text, questions to the viewer, links to social media to share data, etc. The authoring editor 106 may be accessed from a cloud computing environment such as the content server 108 and rendered in a web browser on the author computing device 102.

The author computing device 104 sends the content synchronization data to the content server 108. The content server 108 has a content synchronization Application Programming Interface ("API") 110 and a content database 112. The content server 108 stores the content synchronization data in the content database 112. For instance, the content server 108 may generate a new entry in the content database 112 for a new layout received from the author computing device 104. The content server 108 may assign the new layout an identifier, e.g., a number. The content server 108 may then store content synchronization data for that layout identifier and any updates to the content synchronization data according to that layout identifier. Therefore, the author 102 may work on different layouts and store new or updated content synchronization data based upon the layout identifier in the content server database 112. The content synchronization data may be stored until a request is received from the user computing device 116.

The user computing device 106 includes a media API 118 and a media player 120. The media player 120 may be downloaded from the content server 108 or another server, may be prestored on the computing device 106, or may be accessed through a cloud computing environment such as the content server 108 and rendered on the user computing device 116. The media player 120 is preprogrammed with logic or provided with logic that provides a link to the content server 108. For instance, the media player 120 may be embedded in a website, e.g., a cooking store website. The user 114 utilizes the user computing device 116 to access the website through a web browser and render the media player 120 in the web browser. The media player has logic that is utilized to request the additional content data from the content server 108. In one embodiment, the media player 120 stores a particular layout identifier and sends that layout identifier as part of the request. Upon receiving the request, the content server 108 retrieves the content synchronization data associated with the layout identifier from the content database 112. The content server 108 then utilizes the content synchronization API 110 to automatically generate a manifest, e.g., code, based upon the content synchronization data. For instance, JavaScript Object Notation ("JSON") may be utilized as the code for the manifest. The author 102 provides inputs through a user interface as to the additional content and the times for the additional content to be played in synchronization with the media. The content server 108 may provide the human readable content synchronization data to the content synchronization API 110 to generate a manifest in JSON. The content server 110 may then send the manifest to the media player 120 at the user computing device 116. The media player 120 then automatically generates HTML code so that the additional content may be rendered by the media player 120.

The user computing device 116 receives the media for playback from the media server 122. Further, the user computing device 116 may utilize the media API 118 to obtain media time data from a media database 124 at the media server 122 that stores the media and associated time data. For instance, the media player 120 streams the media from the media server 122 for playback, obtains the additional content from the content server 108, obtains the content synchronization data from the content server 108, and obtains the current media time playback data from the media server 122. Therefore, the media player 120 may render the layout determined by the author 102, find out the current time of media playback from the media server 122, and render the additional content based upon that current media playback time and the content synchronization data. The media player 120 may be embedded in a variety of contexts, e.g., websites, blogs, etc.

Figure 2A:
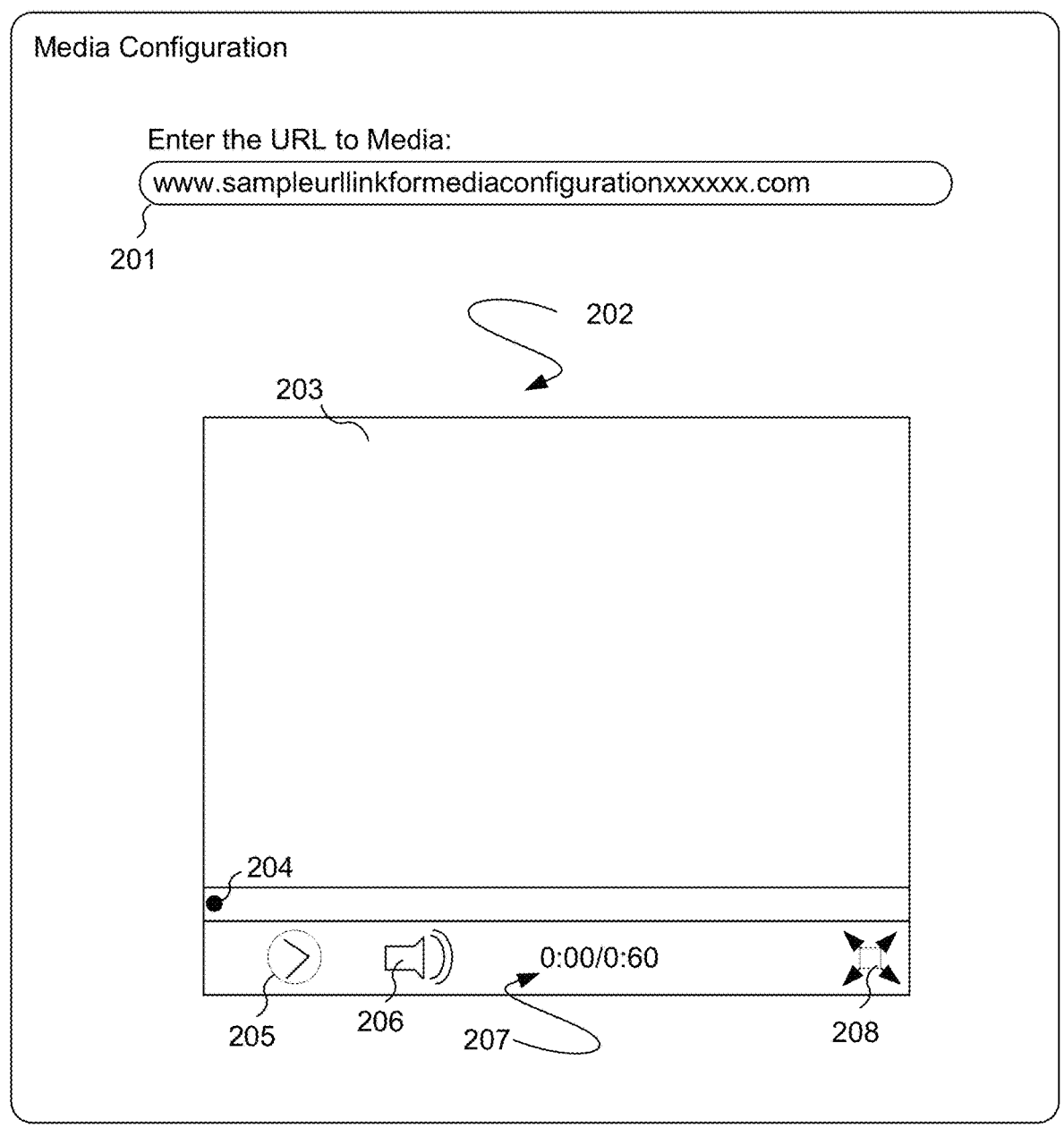
FIGS. 2A-2C illustrate examples of screen displays that may be utilized during the authoring process at the author computing device illustrated in FIG. 1.
Figure 2B:
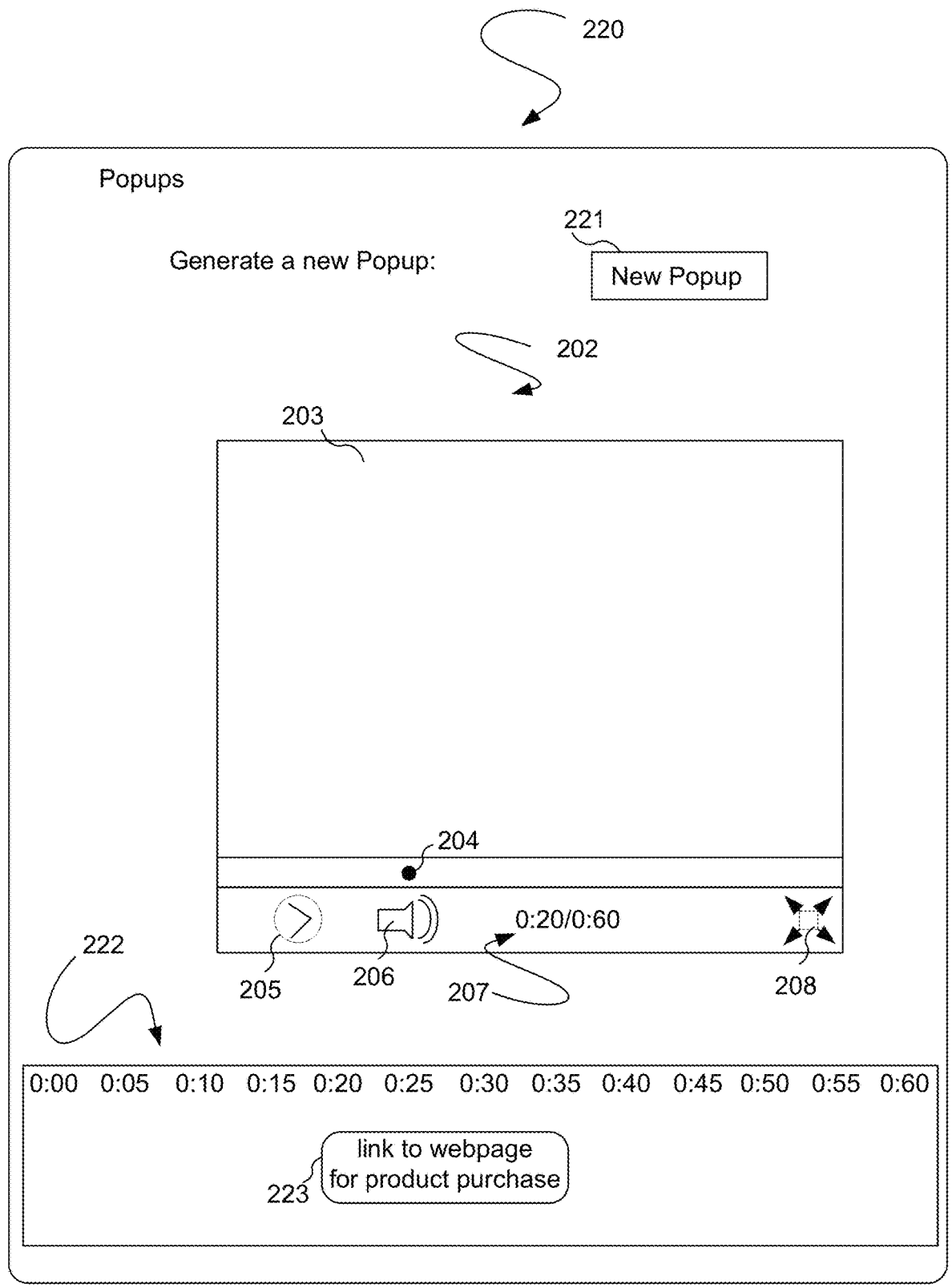
Figure 2C:

FIGS. 2A-2C illustrate examples of screen displays that may be utilized during the authoring process at the author computing device 104 illustrated in FIG. 1. FIG. 2A illustrates a media configuration display screen 200. The media configuration display screen 200 is utilized by the author 102 to determine the particular media upon which the author 102 wants to base a layout. For instance, the author 104 may input a URL link to a video at a media input field 201.

The author 104 may then preview the media through a media player 202. The media player 202 has a display screen 203, a timeline indicium 204, a play/pause indicium 205, an audio volume indicium 206, a timeline time indicium 207, and a screen dimension adjustment indicium 208. The timeline indicium 204 displays the time in the video at which the timeline indicium 204 is positioned.

FIG. 2B illustrates a popup configuration display screen 220 that may be utilized by the author 102 to generate content synchronization data. The author 102 may preview the media in the media player 202 in the popup configuration display screen 202. After reaching a position in the media at which the author wants to add content, the author 102 may generate a new popup by selecting a new popup indicium 221. The author 102 may then utilize a timeline synchronization display 222 to add a popup 223 at the particular times that the author wants the popup synchronized with the media content. For instance, the author 102 may preview a cooking video and notice that a pair of cooking tongs are displayed for a duration from twenty seconds to thirty five seconds of the video. The author 102 may then utilizer a timeline slider, e.g., a cursor or other dragging feature, to drag the section of the timeline synchronization display 222 corresponding to the duration of twenty seconds to thirty five seconds. The popup 223 is then displayed in the timeline synchronization display 222 for that duration. The user 114 will then view the popup 223 during that time period in synchronization with playback of the media. For instance, the popup 223 may be a link to a webpage for product purchase of the pair of tongs. The user 114 may click on the popup 223 to obtain an expanded popup screen to get more information about the product and/or be redirected to a webpage at which the user 114 may purchase the product.

Although a single popup 223 has been illustrated for ease of illustration, the author 102 may insert a plurality of popups in the timeline synchronization display 222. The plurality of popups may be at the same time, different times, and/or overlapping times. Further, the popups may be different, e.g., links to webpages, images, text, questions, etc. Therefore, the author 102 is able to visually add content to media in a synchronized manner by visually adding popups to a timeline without having to manually prepare any code.

FIG. 2C illustrates a popup generation display screen 240. The popup generation display screen 240 allows the author 102 to input information for the popup 223 illustrated in FIG. 2B. For instance, the author 102 may input a URL link for product purchase at a product purchase URL input field 241, a title at a title input field 242, a popup image to be displayed for the popup 223 at a popup image field 243, and a product description at a product description field 244.

The author 102 may also provide click through requirements through various screen displays. For example, the author 102 may provide payment to an entity operating the content server 108 based upon a quantity of clicks of a particular popup. The author 102 may provide a budget input so that the content server 108 is aware of when the content synchronization data should or should not be provided depending upon a quantity of clicks and the budget input. Further, the author 102 may also provide scheduling requirements through various screen displays such that certain popups should or should not be available at certain times. The content server 108 is then aware of when to send or not send certain portions of the content synchronization data, e.g., the author 102 may only want a particular popup for merchandise to be displayed during a sale.

Figure 3A:
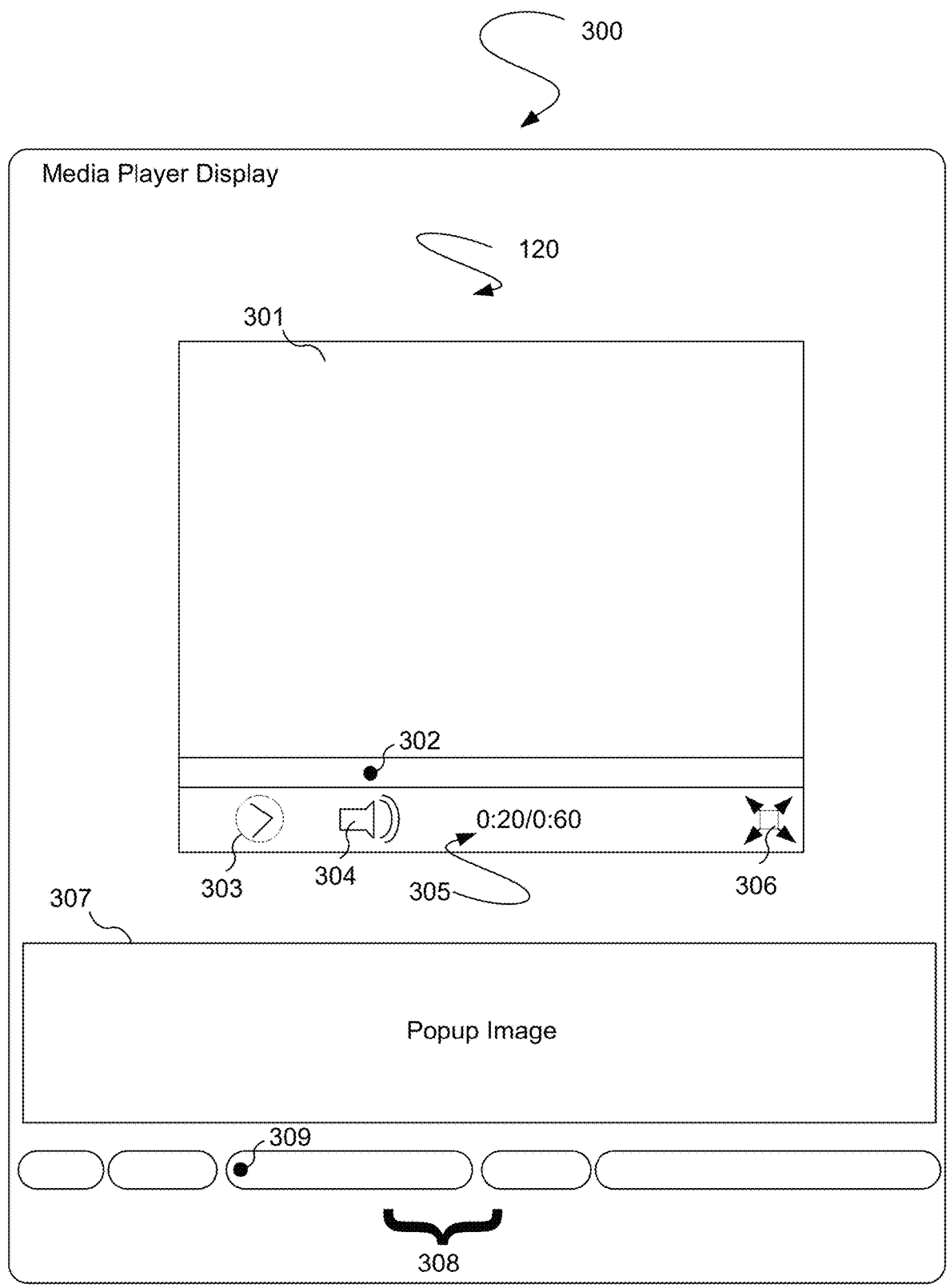
FIGS. 3A and 3B illustrate screen displays displayed by the media player illustrated in FIG. 1.
Figure 3B:
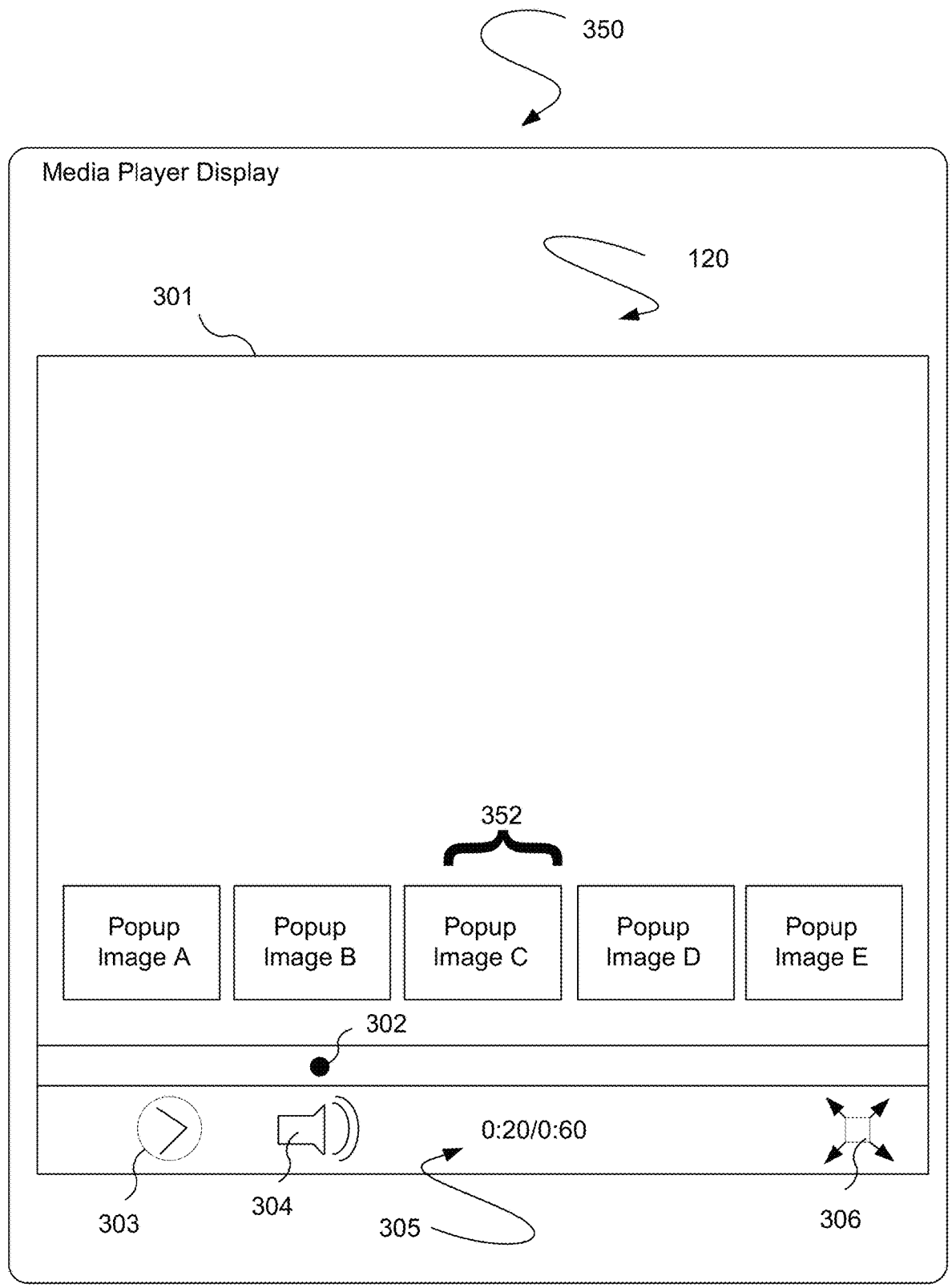

FIGS. 3A and 3B illustrate screen displays displayed by the media player 120 illustrated in FIG. 1. FIG. 3A illustrates a media player display screen 300. The media player display screen 300 displays the synchronized layout prepared by the author 102. The media player display screen 300 displays the media player 120. The media player 120 has a display screen 301, a timeline indicium 302, a play/pause indicium 303, an audio volume indicium 304, a timeline time indicium 305, and a screen dimension adjustment indicium 306. The timeline indicium 302 displays the time in the video at which the timeline indicium 302 is positioned.

A popup image display screen 307 displays a popup that is synchronized with a current time as provided for by the layout authored by the author 102 with the content synchronization data received from the manifest. After the duration for the popup image completes, a next popup may be displayed according to a subsequent time duration provided by the content synchronization data from the manifest. Although a single popup image display screen 307 is displayed for ease of illustration, multiple popup image displays screens 307 or multiple popups may be displayed in the popup image display screen 307 if the author 102 authored multiple popups for a particular time duration of the media.

In one embodiment, a plurality of popup timeline status displays may be utilized. As each popup is being displayed, a popup timeline indicium in a corresponding timeline status display may be displayed. The user 102 may click on the popup image display screen 307 to obtain an expanded view and obtain more information about the popup.

FIG. 3B illustrates a media player display screen 350 that displays images of each popup. The user 102 may select from a plurality of popup images 352 to obtain an expanded view and obtain more information about the selected popup.

Figure 4:
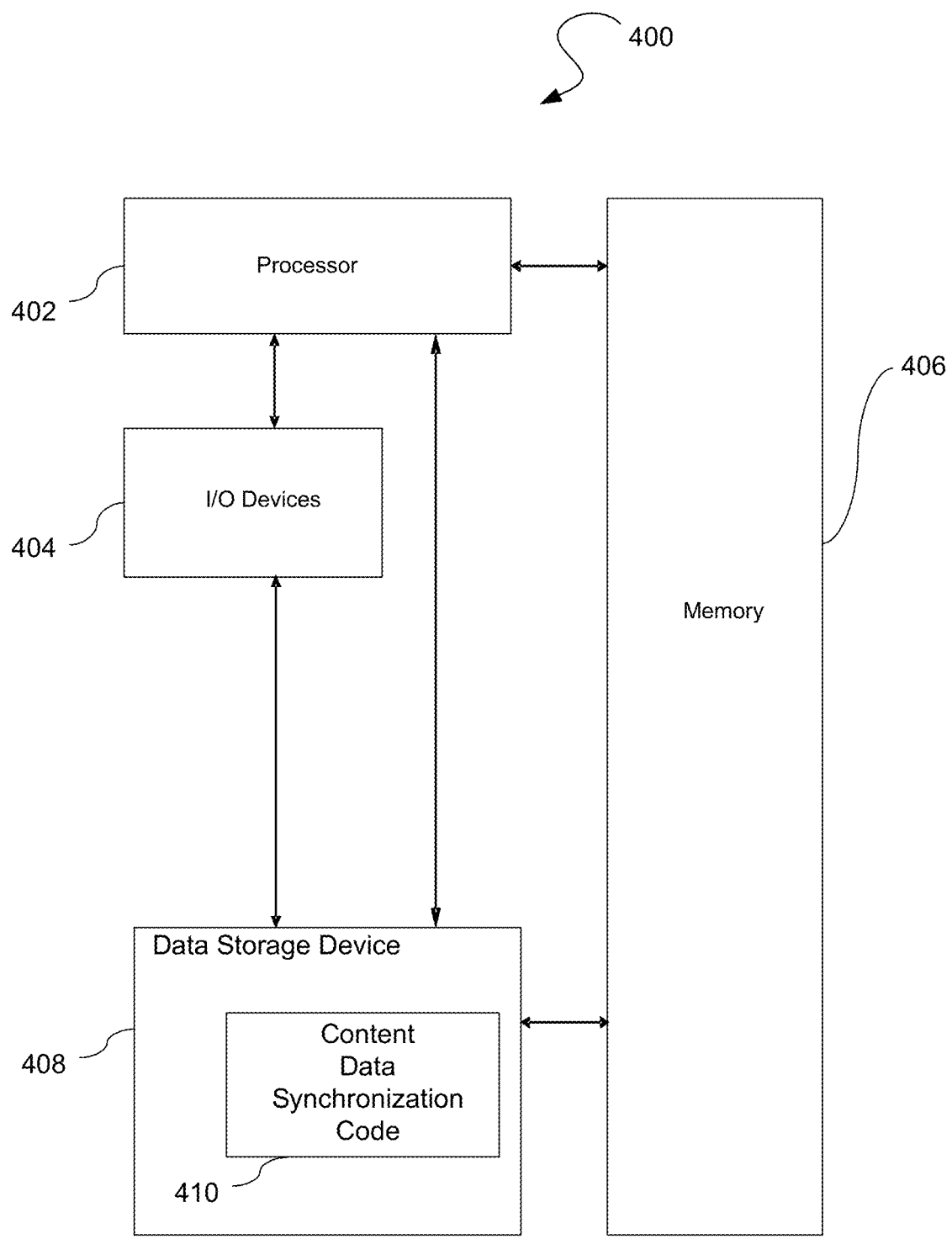
FIG. 4 illustrates a content data synchronization configuration.

FIG. 4 illustrates a content data synchronization configuration 400. In one embodiment, the content data synchronization configuration 400 is implemented utilizing a general purpose computer, e.g., a server computer, or any other hardware equivalents. Thus, the content data synchronization configuration 400 comprises a processor 402, various input/output devices 404, e.g., audio/video outputs and audio/video inputs, storage devices, including but not limited to, a tape drive, a floppy drive, a hard disk drive or a compact disk drive, a receiver, a transmitter, a speaker, a display, an image capturing sensor, e.g., those used in a digital still camera or digital video camera, a clock, an output port, a user input device such as a keyboard, a keypad, a mouse, and the like, or a microphone for capturing speech commands, a memory 406, e.g., random access memory ("RAM") and/or read only memory (ROM), a data storage device 408, and content data synchronization code 410.

The content data synchronization code 410 may be implemented as a set of computer readable instructions that may be utilized by the processor 402 in the memory 406 to perform various actions associated with content modification and interaction. The content data synchronization code 410 may be represented by one or more software applications, where the software is loaded from a storage medium, e.g., a magnetic or optical drive, diskette, or non-volatile memory, and operated by the processor 402 in the memory 406 of the computer. As such, the content data synchronization code 410 including associated data structures of the present disclosure may be stored on a computer readable medium, e.g., RAM memory, magnetic or optical drive or diskette and the like. As an example, the content data synchronization code 410 may be implemented as an application that is downloaded onto a smartphone or tablet device.

Alternatively, the content data synchronization code 410 may be implemented as one or more physical devices that are coupled to the processor 402. The content data synchronization code 410 may be utilized to implement any of the configurations herein.

The content data synchronization configuration 400 may be implemented on a computing device. A computing device may be a server computer, personal computer, laptop, notebook, smartphone, smartwatch, tablet device, other type of mobile deice, etc.

Figure 5:
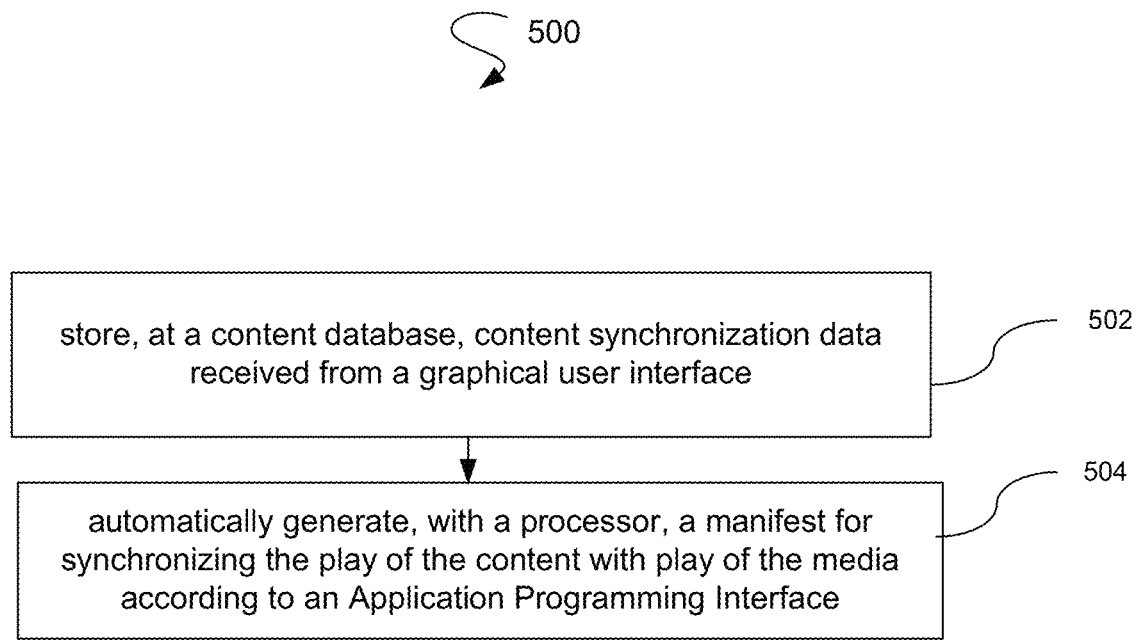
FIG. 5 illustrates a process that is utilized to provide content modification and interaction.

FIG. 5 illustrates a process 500 that is utilized to provide content data synchronization. At a process block 502, the process 500 stores, at a content database, content synchronization data received from a graphical user interface. The content synchronization data has a location of media, a set of content, a content start time, and a content end time. The content start time is a time in the media at which play of the content is to start. The content end time is a time in the media at which the play of the content is to end. Further, at a process block 504, the process 500 automatically generates, with a processor, a manifest for synchronizing the play of the content with play of the media according to an Application Programming Interface.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium such as a computer readable storage device. The instructions may also be created using source code or any other known computer-aided design tool. A computer readable medium may be any medium capable of carrying those instructions and include a CD-ROM, DVD, magnetic or other optical disc, tape, silicon memory, e.g., removable, non-removable, volatile or non-volatile, packetized or non-packetized data through wireline or wireless transmissions locally or remotely through a network. A computer is herein intended to include any device that has a general, multi-purpose or single purpose processor as described above.

It is understood that the processes, systems, apparatuses, and compute program products described herein may also be applied in other types of processes, systems, apparatuses, and computer program products. Those skilled in the art will appreciate that the various adaptations and modifications of the embodiments of the processes, systems, apparatuses, and compute program products described herein may be configured without departing from the scope and spirit of the present processes and systems. Therefore, it is to be understood that, within the scope of the appended claims, the present processes, systems, apparatuses, and compute program products may be practiced other than as specifically described herein.

We claim:

1. A computer program product comprising a non-transitory computer useable medium having a computer readable program, wherein the computer readable program when executed on a computer causes the computer to:

receive, at a content server from an author computing device, a layout for media with a time duration;

receive, at the content server from the author computing device, content;

assign, at the content server, a layout identifier to the layout;

store, at a content database, the layout according to the layout identifier;

store, at the content database, content synchronization data received, from the author computing device, associated with the layout identifier, the content synchronization data having the content, a content start time, a content end time, and a location of the media with the time duration, the content start time being a time in the media with the time duration at which play of the content is to start, the content end time being a time in the media with the time duration at which the play of the content is to end;

receive, at the content server, a request for the layout according to the layout identifier from a media player at a computing device;

retrieve, at the content server, the content synchronization data associated with the layout identifier;

automatically generate, with a processor in operable communication with the content server, a manifest comprising a first set of computer executable code according to the content synchronization data for the layout; and send the manifest to the media player that automatically generates a second set of computer executable code such that the computing device implements the second set of computer executable code to render the layout on a display device in operable communication with the computing device and perform a synchronized playback of the content with the media based upon the manifest, the second set of computer executable code being distinct from the first set of computer executable code.

2. The computer program product of claim 1, wherein the layout is rendered on the display device via a graphical user interface that provides a visual timeline slider.

* * * * *